(12) United States Patent
Lin

(10) Patent No.: US 7,126,796 B2
(45) Date of Patent: Oct. 24, 2006

(54) READ SENSOR WITH OVERLAYING LEAD LAYER TOP SURFACE PORTIONS INTERFACED BY HARD BIAS AND TAPERED LEAD LAYERS

(75) Inventor: Tsann Lin, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 174 days.

(21) Appl. No.: 10/256,111

(22) Filed: Sep. 25, 2002

(65) Prior Publication Data

US 2004/0057163 A1 Mar. 25, 2004

(51) Int. Cl.
*G11B 5/39* (2006.01)
(52) U.S. Cl. ...................................... 360/322
(58) Field of Classification Search ................ 360/322
See application file for complete search history.

(56) References Cited

U.S. PATENT DOCUMENTS

| | | | | |
|---|---|---|---|---|
| 5,442,507 A * | 8/1995 | Koga et al. | ................. | 360/322 |
| 5,641,557 A | 6/1997 | Ishiwata | ................... | 428/209 |
| 5,761,010 A | 6/1998 | Mimura | ..................... | 360/113 |
| 5,930,084 A | 7/1999 | Dovek et al. | ............... | 360/113 |
| 5,936,810 A | 8/1999 | Nakamoto et al. | .......... | 360/113 |
| 5,949,623 A | 9/1999 | Lin | ........................... | 360/113 |
| 6,030,753 A | 2/2000 | Lin | ........................... | 430/314 |
| 6,040,962 A | 3/2000 | Kanazawa et al. | .......... | 360/113 |
| 6,074,767 A | 6/2000 | Lin | ........................... | 428/692 |
| 6,209,193 B1 | 4/2001 | Hsiao | ..................... | 29/603.15 |
| 6,274,025 B1 | 8/2001 | Chang et al. | ............... | 205/118 |
| 6,291,251 B1 | 9/2001 | Nam | ............................ | 438/3 |
| 2001/0003022 A1 | 6/2001 | Kakihara | ..................... | 428/692 |
| 2001/0026424 A1 | 10/2001 | Kamata et al. | ............. | 360/322 |
| 2001/0028538 A1 | 10/2001 | Watanabe et al. | ........... | 360/319 |
| 2002/0093773 A1* | 7/2002 | Pinarbasi | ..................... | 360/322 |
| 2003/0053265 A1* | 3/2003 | Terunuma et al. | .......... | 360/322 |
| 2003/0214760 A1* | 11/2003 | Sasaki et al. | ................ | 360/322 |

FOREIGN PATENT DOCUMENTS

| | | |
|---|---|---|
| JP | 2001-209913 | 8/2001 |
| JP | 2001-223412 | 8/2001 |

OTHER PUBLICATIONS

*IBM Research Disclosure*, Jan. 2000, No. 429163, "Robust insulating contiguous junction".

\* cited by examiner

*Primary Examiner*—Craig A. Renner
(74) *Attorney, Agent, or Firm*—Ervin F. Johnston

(57) ABSTRACT

A read head, which has a head surface facing a moving magnetic medium, includes a read sensor that has first and second side top surface portions and a central top surface portion located between the first and second side top surface portions. First and second overlaying lead layers interface the first and second side top surface portions. First and second hard bias and tapered lead layers interface the first and second overlaying lead layers. A central top surface portion of the read sensor has a width that defines a track width of the read sensor. A method of making the read head includes ion-milling a partially oxidized portion of a cap layer and, after depositing the aforementioned first and second hard bias and tapered lead layers, preferentially reactive ion etching (RIE) the overlaying lead layer not covered by the first and second hard bias and tapered lead layers, so as to define the central top surface portion of the read sensor.

11 Claims, 12 Drawing Sheets

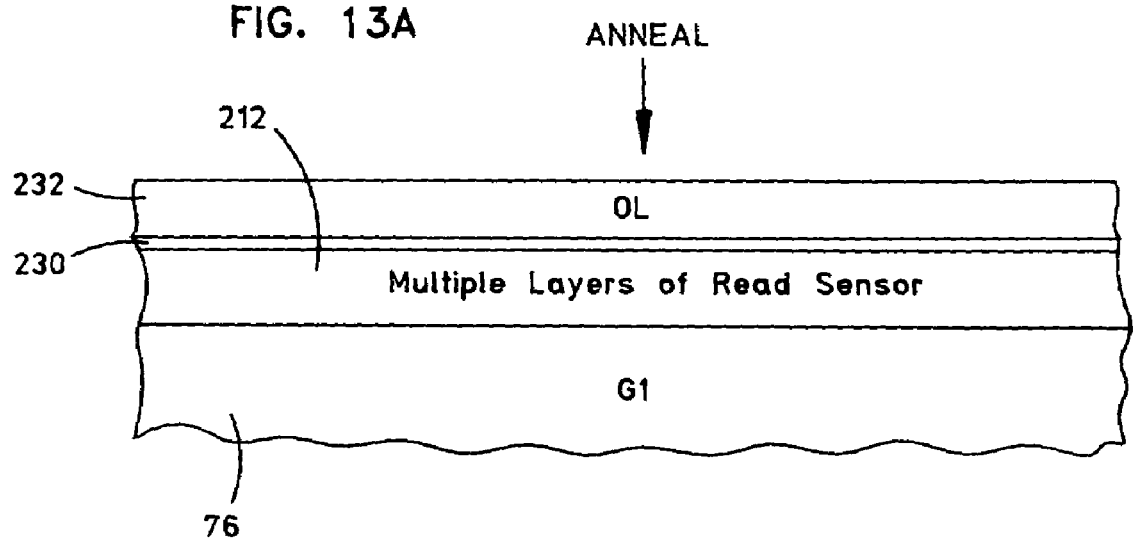
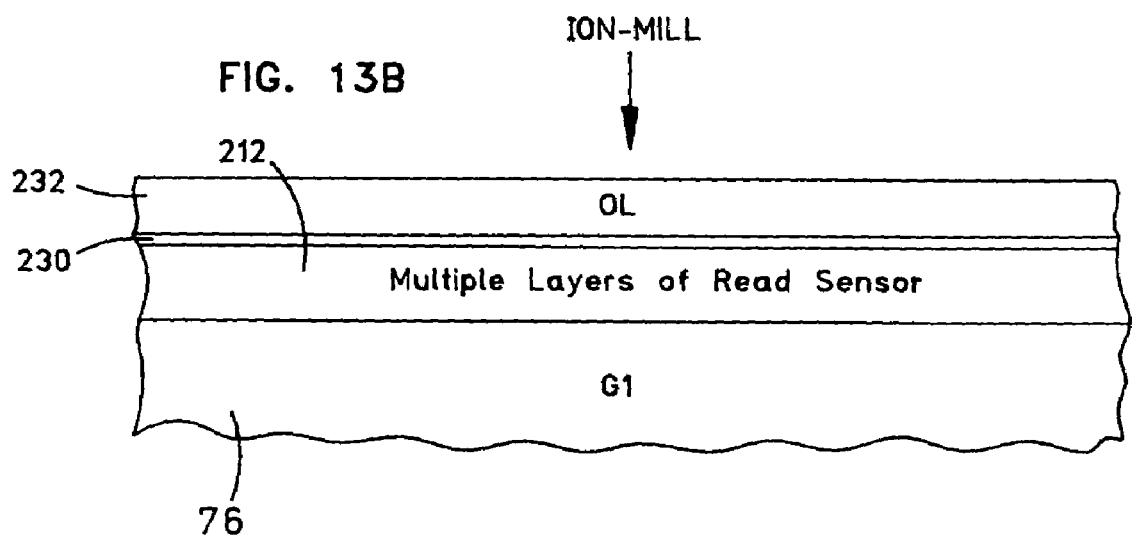

READ SENSOR WITH OVERLAYING LEAD LAYER TOP SURFACE PORTIONS INTERFACED BY HARD BIAS AND TAPERED LEAD LAYERS

BACKGROUND OF THE INVENTION

1. Field of the Invention

The present invention relates to a read head having a read sensor overlaid with reactive-ion-etch defined lead layers and a method of making and, more particularly, to first and second overlaying lead layers which overlay first and second spaced apart top surface portions of the read sensor with the first and second overlaying lead layers mainly providing sufficient shunting of a sense current to render side portions of the read sensor below the overlaying lead layers inactive.

2. Description of the Related Art

The heart of a computer is a magnetic disk drive which includes a rotating magnetic disk, a slider that has a magnetic head assembly including write and read heads, a suspension arm above the rotating disk and an actuator arm. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the actuator arm swings the suspension arm to place the write and read heads over selected circular tracks on the rotating disk where signal fields are written and read by the write and read heads. The write and read heads are connected to processing circuitry that operates according to a computer program to implement the writing and reading functions.

An exemplary high performance read head employs a giant magnetoresistance (GMR) read sensor for sensing magnetic signal fields from the rotating magnetic disk. The GMR read sensor comprises seed layers, a nonmagnetic electrically conductive spacer layer that is sandwiched between a ferromagnetic pinned layer and a ferromagnetic sense layer, and cap layers. An antiferromagnetic pinning layer interfaces the pinned layer for pinning the magnetization of the pinned layer 90° to an air bearing surface (ABS) wherein the ABS is an exposed surface of the read sensor that faces the rotating disk. First and second hard bias and tapered lead layers are connected to the read sensor for conducting a sense current therethrough. The magnetization of the sense layer is free to rotate upwardly and downwardly with respect to the ABS from a quiescent or zero bias point position in response to positive and negative signal fields from the rotating magnetic disk. The quiescent position of the magnetization of the sense layer, which is parallel to the ABS, is when the sense current is conducted through the read sensor without signal fields from the rotating magnetic disk.

When a sense current is conducted through the read sensor, electrical resistance changes cause potential changes that are detected and processed as playback signals. The sensitivity of the read sensor increases with a giant magnetoresistance (GMR) coefficient $\Delta R/R$ where $\Delta R$ is the change in resistance of the read sensor from minimum resistance (when magnetizations of sense and pinned layers are parallel to each other) to maximum resistance (when magnetizations of the sense and pinned layers are antiparallel to each other) and R is the resistance of the read sensor at minimum resistance.

First and second hard bias and tapered lead layers are connected to first and second side surfaces of the read sensor, which connection is known in the art as a contiguous junction. This contiguous junction is described in commonly assigned U.S. Pat. No. 5,018,037 which is incorporated by reference herein. The first and second hard bias layers longitudinally stabilize the magnetization of the sense layer of the read sensor in a single domain state which is important for proper operation of the read sensor. The first and second tapered lead layers are for the purpose of conducting the aforementioned sense current through the read sensor parallel to the ABS and parallel to the thin film interfaces of the read sensor.

Rows and columns of the sliders having magnetic head assemblies are fabricated on a wafer. Each magnetic head assembly is located on a respective slider wherein each slider is a portion of the wafer. After fabricating the rows and columns of the sliders, the wafer is diced into rows of sliders and each row of sliders is then lapped to form the aforementioned ABS. Each row is then diced into individual sliders wherein each slider has a magnetic head assembly with write and read heads exposed at the ABS.

In the fabrication process of the rows and columns of the sliders, the read sensor of the read head and the first and second hard bias and tapered lead layers connected thereto are deposited on the wafer in an integrated ion-beam/DC-magnetron sputtering system. The rows and columns of sliders, where the read sensor and the first and second hard bias and tapered lead layers are to be constructed, are typically located within a square or rectangle on the wafer. The wafer itself is typically circular. After the read sensor, comprising the seed, pinned, spacer, sense and cap layers, are deposited over the entire wafer, the read sensor is then annealed which partially oxidized the top layer of the cap layers. A bilayer photoresist mask is then applied and exposed in a photolithographic tool to mask the read sensor in its central portion and then subsequently developed in a solvent to form undercuts on each side of the bilayer photoresist mask. The read sensor, which is unmasked by the bilayer photoresist mask, is removed by ion milling until the first read gap layer is exposed. The first and second hard bias layers are then deposited so that they abut the first and second side surfaces of the read sensor with tapered portions of the hard bias layers overlaying the read sensor. This step may be accomplished by ion beam sputtering at an angle of 10° while the wafer is rotated. The first and second tapered lead layers are then immediately deposited which interface the first and second hard bias layers as well as extending under the undercuts and tapering toward one another. The first and second tapered lead layers may be deposited by ion beam sputtering also at an angle of 10° while the wafer is rotated. The bilayer photoresist mask is then lifted off.

The prior art process has several disadvantages. One disadvantage is that the partially oxidized portion of the top layer of the cap layers prevents proper electrical contact between the read sensor and the first and second hard bias and tapered lead layers in two side portions of the read sensor. Consequently, the sense current is restricted in its flow from the first and second hard bias and tapered lead layers to the read sensor in the two side portions of the read sensor. Second, due to shadowing effects of the bilayer photoresist mask in the undercuts, it is difficult for the first and second tapered lead layers to penetrate into the undercuts during deposition of the first and second tapered lead layers. This results in thin taper portions formed somewhere uncertainly in the undercuts. These taper portions are so thin that substantial current shunting cannot be attained and the side portions of the read sensor below the undercuts remain active during sensor operation which causes side reading.

SUMMARY OF THE INVENTION

In the present invention first and second overlaying lead layers interface first and second side top surface portions of the read sensor and first and second hard bias and tapered lead layers interface top surfaces of the first and second overlaying lead layers. Consequently, the first and second overlaying lead layers mainly provide sufficient shunting of the sense current so that the side portions of the read sensor below the first and second overlaying lead layers are rendered inactive. Only a central top surface portion of the read sensor between the first and second overlaying lead layers defines a track width of the read sensor and side reading is obviated.

A novel fabrication process for making the present invention comprises depositing the aforementioned read sensor, which comprises the multiple layers of the read sensor, and then depositing an overlaying lead layer which is preferably made of a 240 Å thick tantalum (Ta) film. After the aforementioned annealing step, ion milling is applied to the entire wafer to remove any oxidized tantalum (Ta) film. Typically, a removal of 40 Å of the tantalum film removes the oxidized portion, leaving 200 Å of the tantalum (Ta) film. The aforementioned bilayer photoresist mask is then applied and exposed in a photolithographic tool to mask the read sensor and the overlaying lead layer in a central region. The bilayer photoresist mask is then developed, as discussed hereinabove, in a solvent to form the undercuts. The read sensor and the overlaying lead layer in the unmasked side regions are then removed by ion milling until the first read gap layer is exposed. First and second hard bias layers are then deposited, as discussed hereinabove, abutting the side surfaces of the read sensor and overlapping first top surface portions of the overlaying lead layer. First and second tapered lead layers are then deposited, as discussed hereinabove, overlapping the first and second hard bias layers and overlapping second top surface portions of the overlaying lead layer. The bilayer photoresist mask is then lifted off.

The next step of the invention requires that a portion of the overlaying lead layer be preferentially removed by reactive ion etching (RIE). The overlaying lead layer has first and second side portions below the first and second hard bias and tapered lead layers and an exposed central portion therebetween. The invention applies reactive ion etching (RIE) to remove the central portion, leaving the first and second side portions of the overlaying lead layer below the first and second tapered lead layers as first and second overlaying lead layers. Removal of the central portion of the overlaying lead layer is accomplished by making the first and second tapered lead layers of a material which will not be removed by reactive ion etching (RIE) and making the overlaying lead layer of a material which will be removed by RIE. This may be accomplished by making the first and second tapered lead layers of rhodium (Rh) or ruthenium (Ru) with electrical resistivities of 14.1 $\mu\Omega$-cm and 18.1 $\mu\Omega$-cm, respectively. The overlaying lead layer may be tantalum (Ta), tungsten (W) or molybdenum (Mo) with electrical resistivities of 39.21 $\mu\Omega$-cm with an $\alpha$-phase, 15.2 $\mu\Omega$-cm and 20.3 $\mu\Omega$-cm respectively. Further, the read sensor may have a rhodium (Rh), ruthenium (Ru) or chromium (Cr) cap layer so that the rhodium (Rh), ruthenium (Ru) or chromium (Cr) layer acts as an etch stopper layer to the reactive ion etching (RIE).

There are several advantages of the present invention. First, the first and second overlaying lead layers in-situ contact and uniformly overlay the read sensor in the two side portions of the read sensor. The first and second overlaying lead layers, which are preferably made of a tantalum (Ta) film, have a low electrical resistance since the tantalum film deposited on the ruthenium (Ru) or chromium (Cr) etch stopper layer exhibits a low electrical resistivity (39.5 $\mu\Omega$-cm) $\alpha$-phase instead of a high resistivity (180.2 $\mu\Omega$-cm) $\beta$-phase. On the other hand, the Ta film deposited on the rhodium (Rh) etch stopper layer only exhibits a $\beta$-phase, and hence the rhodium (Rh) etch stopper layer can only be used when the overlaying lead layer is made of tungsten (W) or molybdenum (Mo). The use of the first and second Ta overlaying lead layers on the Ru or Cr etch stopper layer in the two side portions of the read sensor results in substantial current shunting, thereby minimizing side reading. For example, the read sensor typically exhibits a sheet resistance of 24.2 ohms/square while Cu/Ru/Ta films exhibit a sheet resistance of 11.8 ohms/square and the first and second Ru tapered lead layers, which are assumed to have an average thickness of 20 Å, exhibit a sheet resistance of 110.5 ohms/square. As a result, 69.4% of the sense current will be shunted into the first and second Ta overlaying lead layers and the first and second Ru tapered lead layers. This shunted current will substantially reduce the GMR coefficient of the read sensor in the two side regions and induce a magnetic field strong enough to align the magnetization of the sense layer of the read sensor perpendicular to the ABS. Hence, side reading can be completely eliminated. In addition, during the sensor operation, heating effects on the magnetization of the pinned layer in the two side regions are much smaller than that in the central region, due to much lower resistance in the side regions. As a result, at elevated sensor operation temperatures, the two side portions still remain at lower temperatures, and thus the magnetization of the pinned layer in the side portions still remains firmly pinned. This firm pinning may facilitate the magnetization of the pinned layer in the central region to be firmly pinned through magnetostatic interaction. Typically the pinning layer is made of an antiferromagnetic film and the pinned layer is made of a ferromagnetic Co—Fe film. When the pinned layer is replaced by pinned layers made of antiparallel-coupled Co—Fe/Ru/Co—Fe films, the pinning layer may not be needed since the magnetostatic interaction may ensure pinning resulting from the antiparallel coupling even when the read sensor is operating at elevated temperatures.

In the read head, the boundary between the read and two side portions of the read sensor is self-aligned by the first and second overlaying lead layers. As a result, the track width of the read sensor is precisely defined by the space between the first and second overlaying lead layers. In the prior art the track width is vaguely defined due to insufficient thickness of the first and second tapered lead layers. Experiments indicate that even with optical photolithographic technology currently used in producing a read sensor, track widths as small as 0.2 μm can be attained.

An object of the present invention is to provide a read sensor with overlaying lead layers wherein the overlaying lead layers are of sufficient thickness and make sufficient electrical contact with the read sensor so that side portions of the read sensor below the first and second overlaying lead layers are rendered inactive to prevent side reading.

Another object is to provide a method of making the aforementioned read sensor with first and second overlaying lead layers.

Other objects and attendant advantages of the invention will be appreciated upon reading the following description taken together with the accompanying drawings.

BRIEF DESCRIPTION OF THE DRAWINGS

FIGS. 13A–13F are side views of various steps in fabricating the present read sensor with first and second hard bias and tapered lead layers abutting first and second side surfaces of the read sensor and first and second overlaying lead layers overlaying side portions of the read sensor.

DESCRIPTION OF THE PREFERRED EMBODIMENTS

Magnetic Disk Drive

Figure 1:
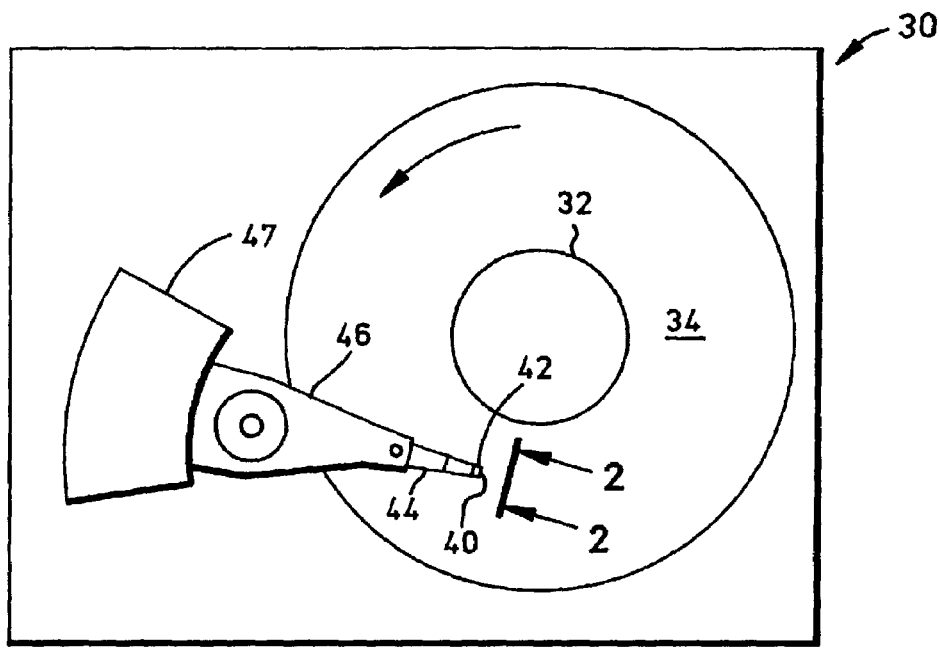
FIG. 1 is a plan view of an exemplary prior art magnetic disk drive.
Figure 2:
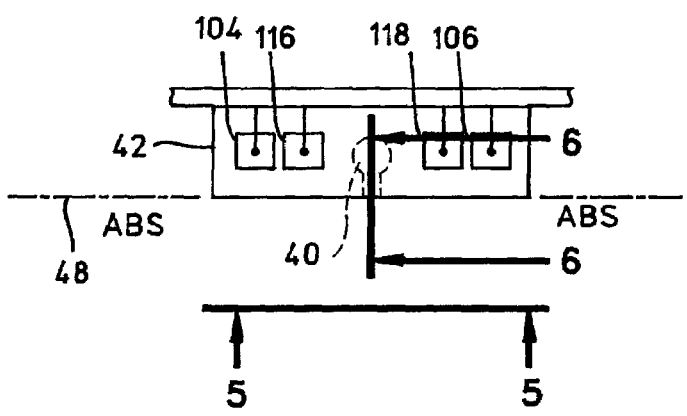
FIG. 2 is an end view of a slider with a magnetic head assembly of the disk drive as seen in plane 2—2 of FIG. 1.
Figure 3:
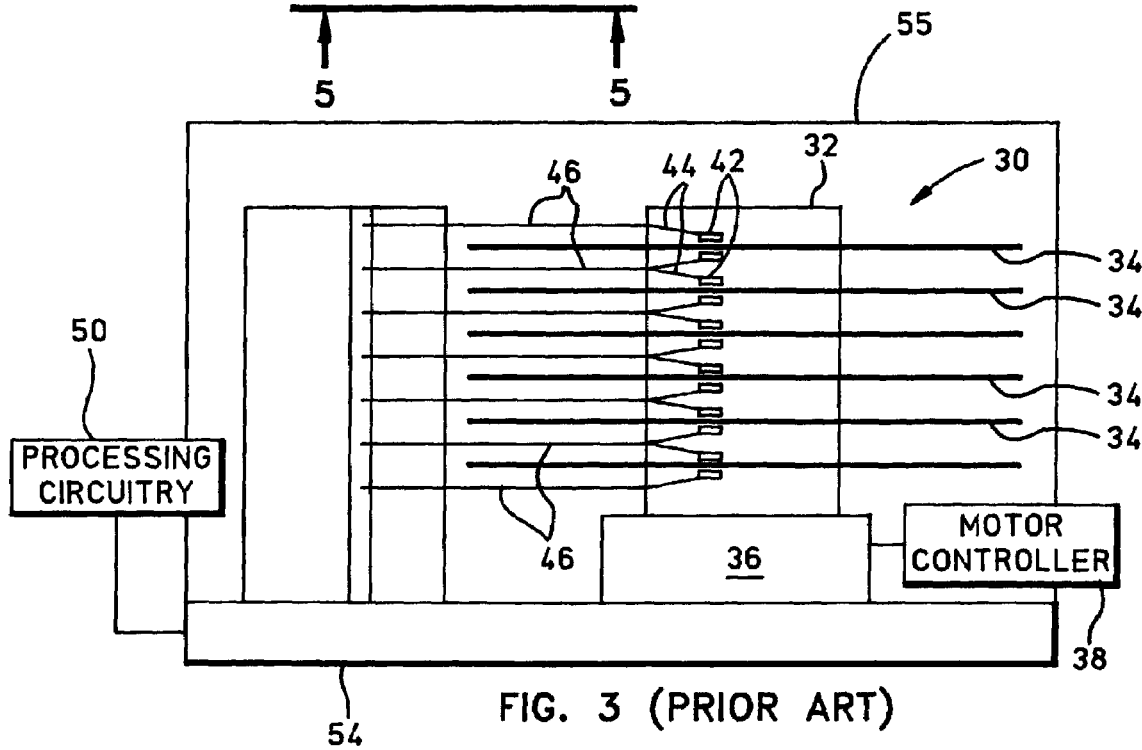
FIG. 3 is an elevation view of the magnetic disk drive wherein multiple disks and magnetic head assemblies are employed.
Figure 4:
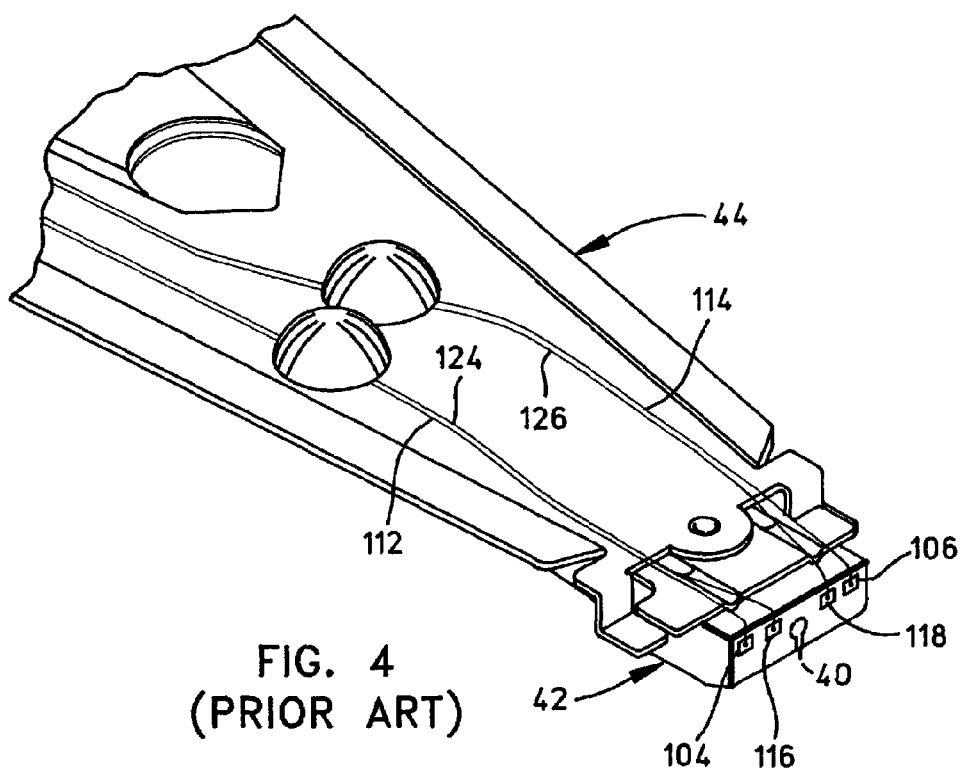
FIG. 4 is an isometric illustration of an exemplary prior art suspension system for supporting the slider and magnetic head assembly.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has magnetic head assembly 40 including write and read heads and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head assembly 40 is in a transducing relationship with a surface of the magnetic disk 34. When the disk 34 is rotated by the spindle motor 36 the slider is supported on a thin (typically, 0.01 μm) cushion of air (air bearing) between the surface of the disk 34 and the air bearing surface (ABS) 48. The magnetic head assembly 40 may then be employed for writing information to multiple circular tracks on the surface of the disk 34, as well as for reading information therefrom. Processing circuitry 50 exchanges signals, representing such information, with the magnetic head assembly 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 within a housing 55, as shown in FIG. 3.

Figure 5:
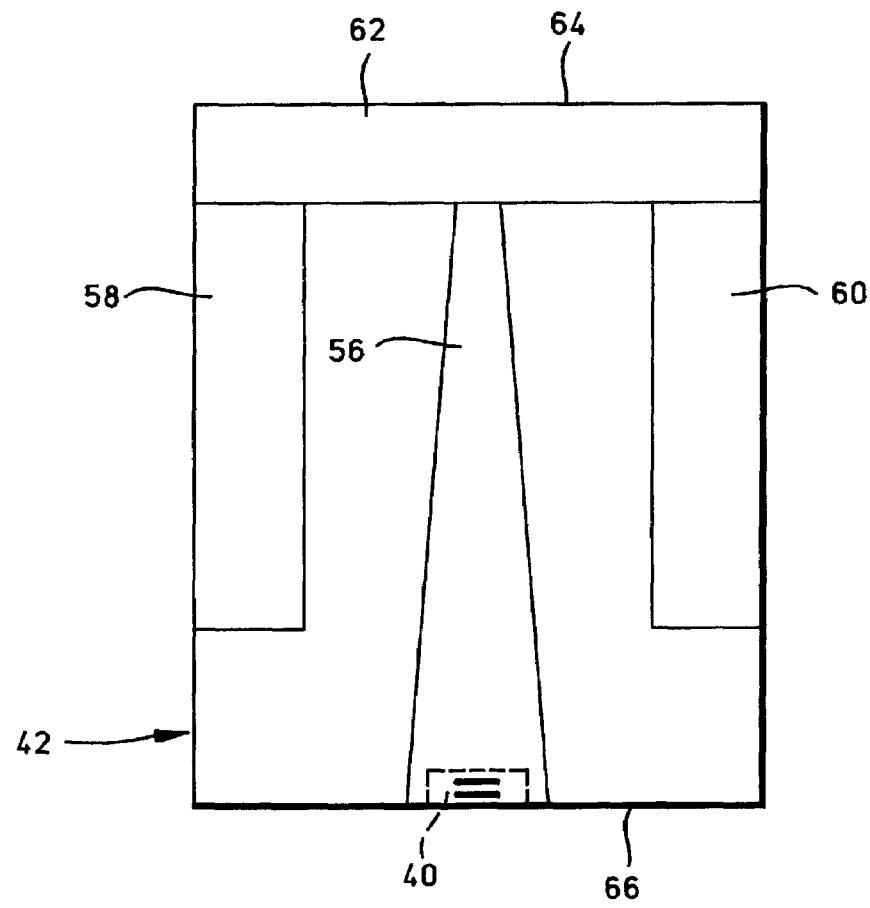
FIG. 5 is an ABS view of the magnetic head assembly taken along plane 5—5 of FIG. 2.

FIG. 5 is an ABS view of the slider 42 and the magnetic head assembly 40. The slider has a center rail 56 that supports the magnetic head assembly 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
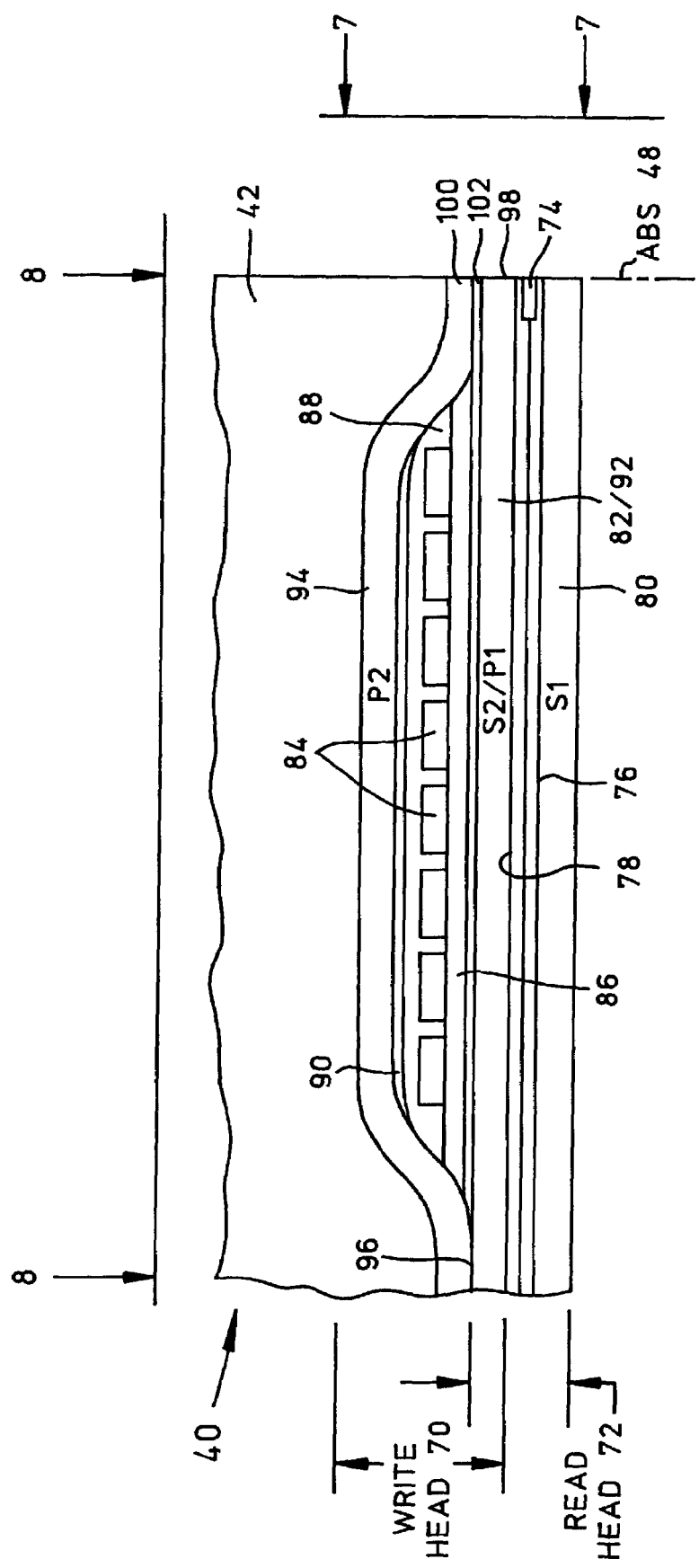
FIG. 6 is a partial view of the slider and a merged magnetic head as seen in plane 6—6 of FIG. 2.
Figure 7:
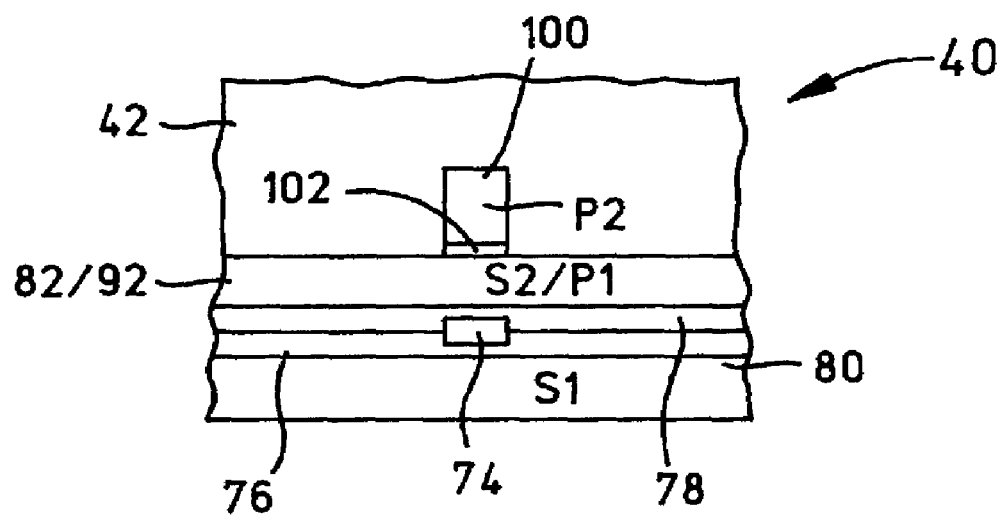
FIG. 7 is a partial ABS view of the slider taken along plane 7—7 of FIG. 6 to show the write and read heads of the magnetic head assembly.

FIG. 6 is a side cross-sectional elevation view of a merged magnetic head assembly 40, which includes a write head 70 and a read head 72, the read head employing a GMR read sensor 74 of the present invention. FIG. 7 is an ABS view of FIG. 6. The read sensor 74 is sandwiched between first and second nonmagnetic electrically insulative read gap layers 76 and 78 and the read gap layers are sandwiched between first and second ferromagnetic shield layers 80 (S1) and 82 (S2). In response to signal fields, the resistance of the read sensor 74 changes. A sense current $I_S$ conducted through the read sensor causes these resistance changes to be manifested as potential changes. These potential changes are then processed as readback signals by the processing circuitry 50 shown in FIG. 3.

Figure 8:
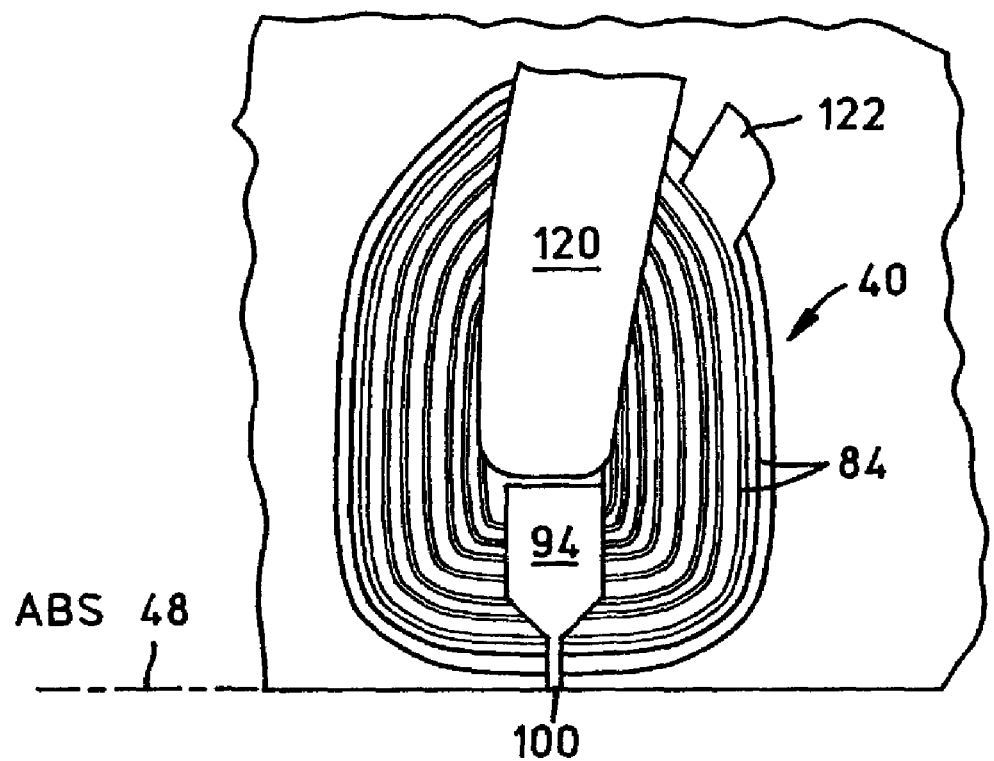
FIG. 8 is a view taken along plane 8—8 of FIG. 6 with all material above the coil layer and leads removed.

The write head 70 of the magnetic head assembly 40 includes a coil layer 84 which is sandwiched between first and second insulation layers 86 and 88. A third insulation layer 90 may be employed for planarizing the write head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second ferromagnetic pole piece layers 92 (P1) and 94 (P2). The first and second ferromagnetic pole piece layers 92 and 94 are magnetically coupled at a back gap 96 and have first and second pole tips 98 and 100 which are separated by a write gap layer 102 at the ABS. Since the second ferromagnetic shield layer 82 and the first ferromagnetic pole piece layer 92 are a common layer this head is known as a merged magnetic head assembly. In a piggyback head (not shown) the layers 82 and 92 are separate layers and are separated by an insulation layer. As shown in FIGS. 2 and 4, first and second solder connections 104 and 106 connect leads from the read sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
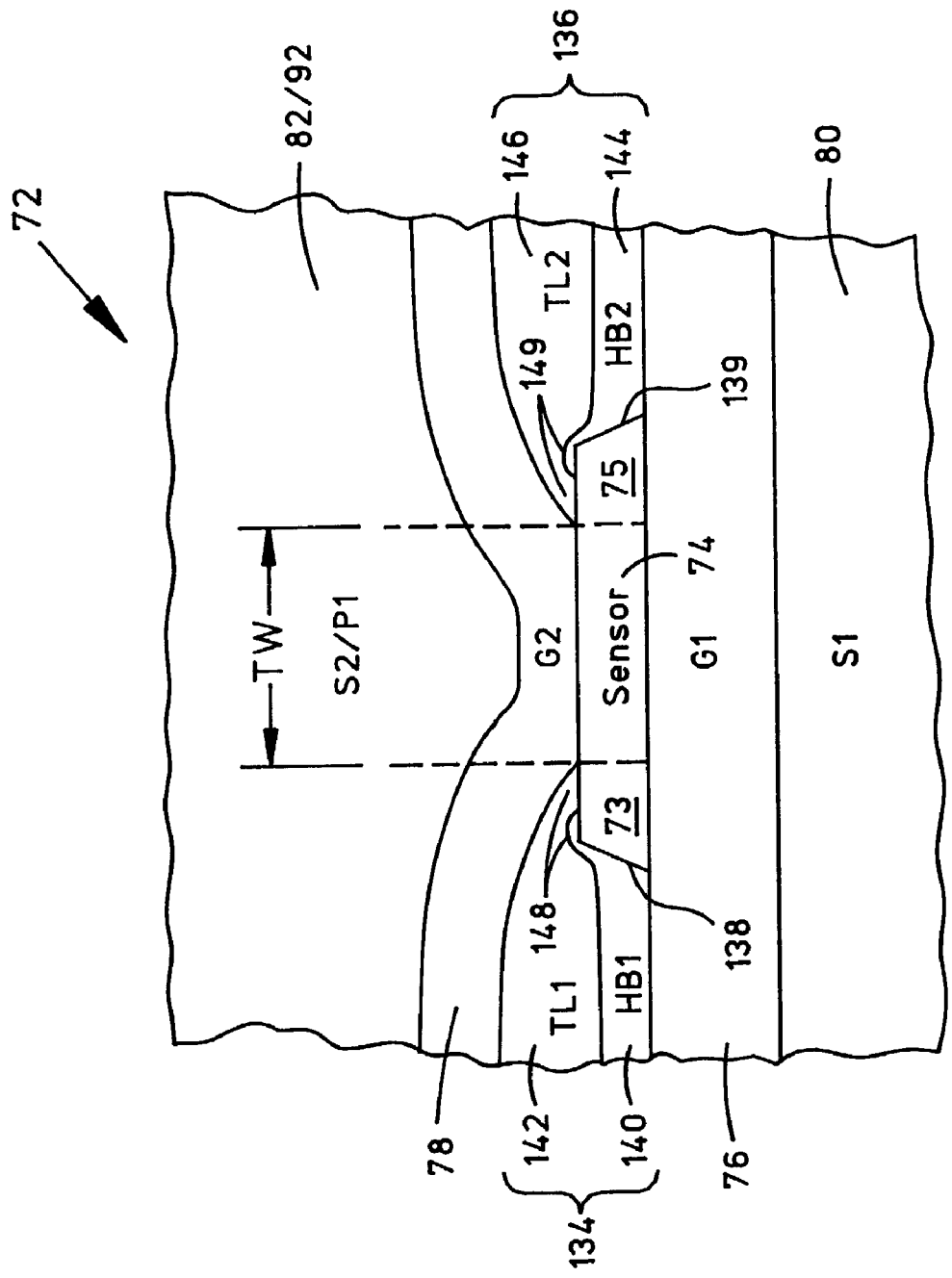
FIG. 9 is an enlarged ABS illustration of a prior art read head which has a GMR read sensor.

FIG. 9 is an enlarged ABS illustration of the read head 72 shown in FIG. 6 wherein the read head 72 includes the read sensor 74. First and second hard bias and tapered lead layers 134 and 136 are connected to first and second side surfaces 138 and 139 of the read sensor 74. This connection is known in the art as a contiguous junction as referred to hereinabove. The first hard bias and tapered lead layers 134 include a first hard bias (HB1) layer 140 and a first tapered lead layer (TL1) 142. The second hard bias and tapered lead layers 136 include a second hard bias layer (HB2) 144 and a second tapered lead layer (TL2) 146. The hard bias layers 140 and 144 produce longitudinal bias fields to stabilize the sense layer of the read sensor 74 in a single magnetic domain state. The read sensor 74 and the first and second hard bias and tapered lead layers 134 and 136 are located between the nonmagnetic electrically insulating first and second read gap layers 76 (G1) and 78 (G2). The first and second read gap layers 76 and 78 are, in turn, located between the first and second ferromagnetic shield layers 80 and 82. It can be seen from FIG. 9 that the first and second hard bias and tapered lead layers 134 and 136 have very thin tapered portions 148 and 149 which overlay top side portions of the read sensor 73 and 75. Because of the small thicknesses of the taper portions 148 and 149, a sense current is partially shunted, thereby causing the side portions of the read sensor 73 and 75 below the tapered portions 148 and 149 to be still active and therefore responsive to signal fields from the rotating magnetic disk beyond the track width (TW). This is known in the art as side reading. Further, insufficient electrical contact is made between the tapered portions 148 and 149 and the top side portion of the read sensor 73 and 75 which exacerbates the problem and which is discussed in more detail hereinafter.

Figure 10:
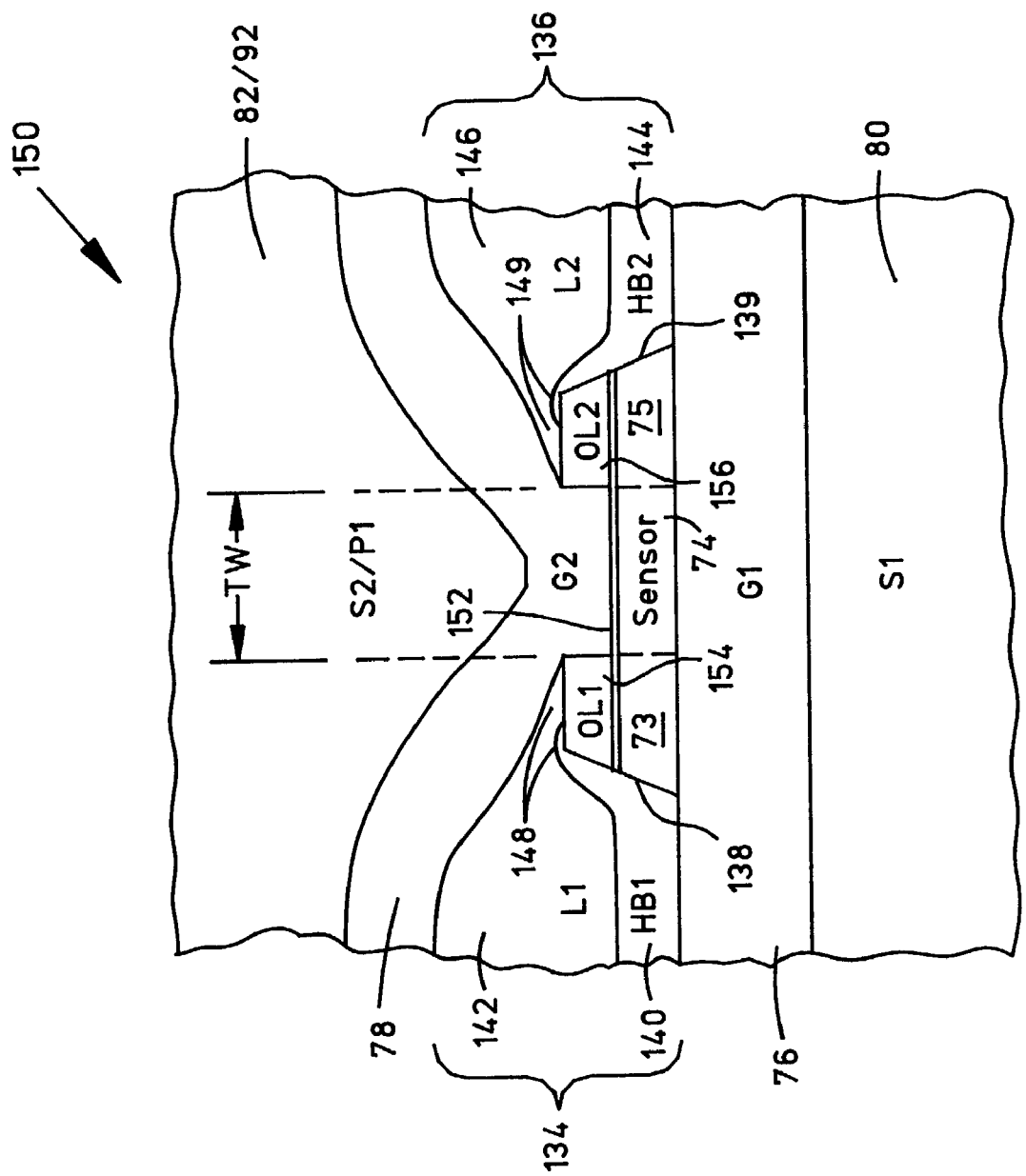
FIG. 10 is an enlarged ABS illustration of the present read head with a GMR read sensor.

FIG. 10 is an ABS illustration of the present read head 150. The read head 150 in FIG. 10 is the same as the read head 72 in FIG. 9 except that an etch stop layer 152 caps the read sensor 74, first and second spaced apart overlaying lead layers OL1 and OL2 154 and 156 interface the etch stop layer 152 in side portions of the read sensor 73 and 75, and first and second hard bias and tapered lead layers 134 and 136 interface the first and second overlaying lead layers 154 and 156. The sense current flows from the first hard bias and tapered lead layers 134 to the first side portion 73 and the first overlaying lead layer 154, thence to the read sensor 74 only, thence to the second side portion 75 and the second overlaying lead layer 156 and thence to the second hard bias and tapered lead layers 136. It can be seen from FIG. 10 that the first and second hard bias layers 140 and 144 overlap a first top surface portion of the first overlaying lead layer 154 and a first top surface portion of the second overlaying lead layer 156 respectively and that a first tapered lead layer 142 (L1) overlaps the first hard bias layer 140 and a second top surface portion of the first overlaying lead layer 154 and a second tapered lead layer 146 (L2) overlaps the second hard bias layer 144 and a second top surface portion of the second overlaying lead layer 156. Mainly because of the large thicknesses and low electrical resistance of the first and second overlaying lead layers 154 and 156, the sense current is almost completely shunted, thereby causing the side portions of the read sensor 73 and 75 below the first and second overlaying lead layers inactive so as to eliminate unwanted side reading. Further, the first and second hard bias and tapered lead layers 154 and 156 have improved electrical contact with the first and second overlaying lead layers 154 and 156 and the side portions of the read sensor 73 and 75 in FIG. 10 as compared to the electrical contact between the tapered portions 148 and 149 and the side portions of the read sensor 73 and 75 in FIG. 9.

Figure 11:
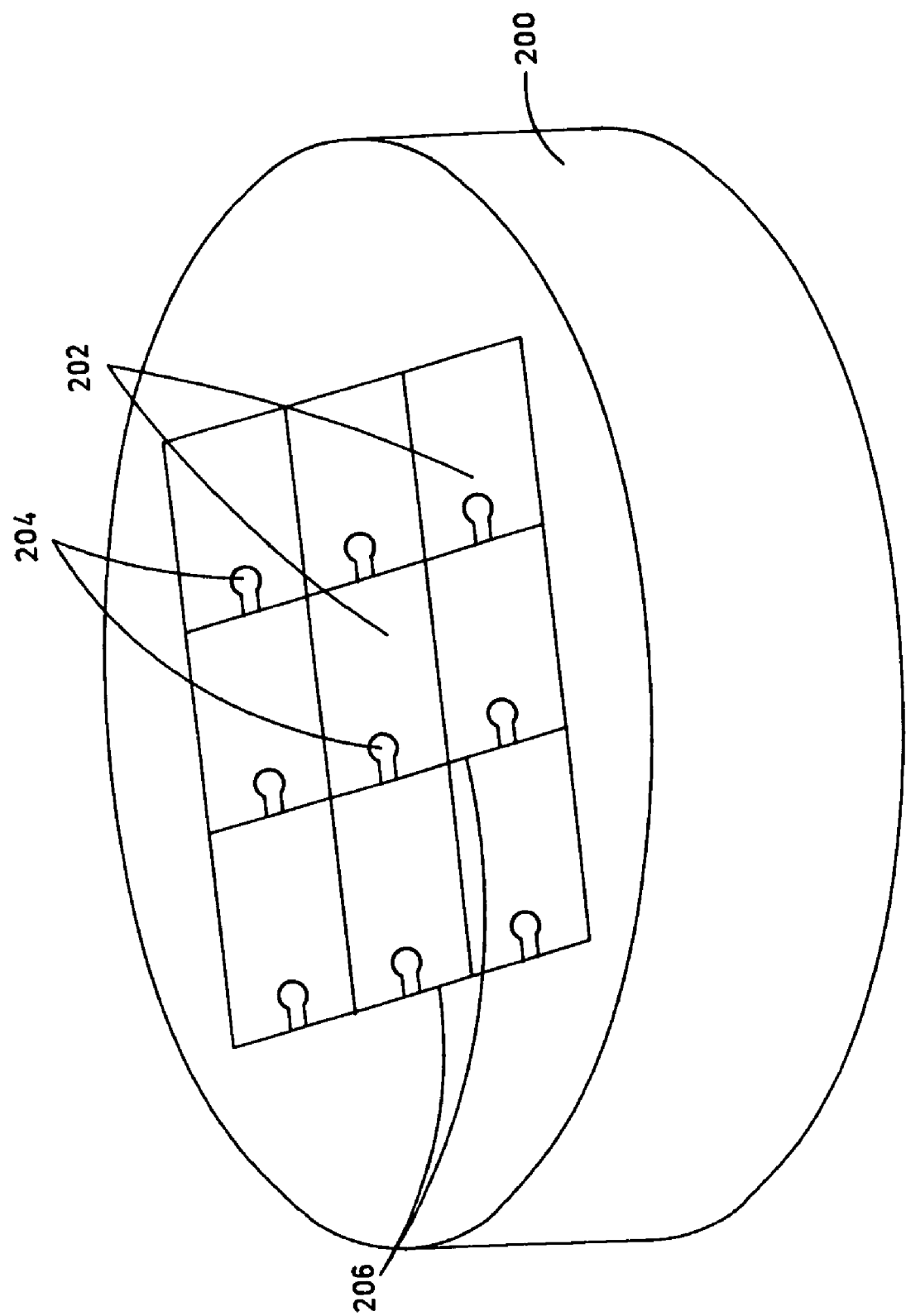
FIG. 11 is an isometric illustration of a wafer with rows and columns of sliders wherein each slider has a magnetic head assembly.

FIG. 11 illustrates a wafer 200 which has rows and columns of sliders 202 wherein each slider has a magnetic head assembly 204. After fabricating the magnetic head assemblies 204, the wafer 200 is diced into rows of the sliders 202 along edges 206. Each row of the sliders 202 is then lapped at an edge 206 to form the aforementioned ABS and then the row is diced into individual sliders 202. The individual sliders 202 are then mounted on a suspension 44, as illustrated in FIG. 3.

Figure 12A:
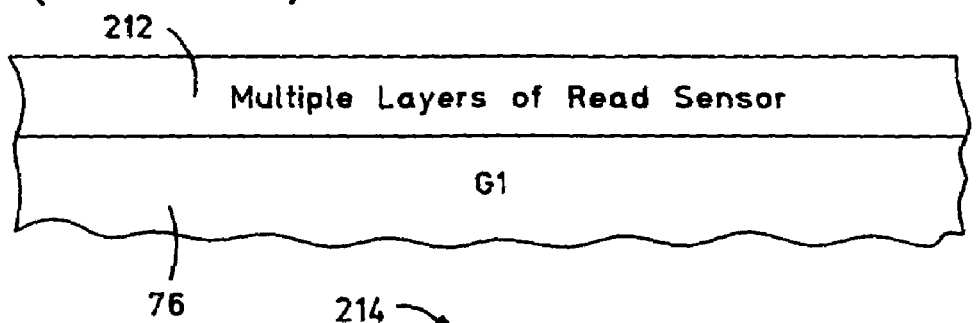
FIGS. 12A–12E are side views of various prior art steps in fabricating a read sensor with first and second hard bias layers abutting first and second side surfaces of the sensor and first and second tapered lead layers overlaying side portions of the sensor.
Figure 12B:
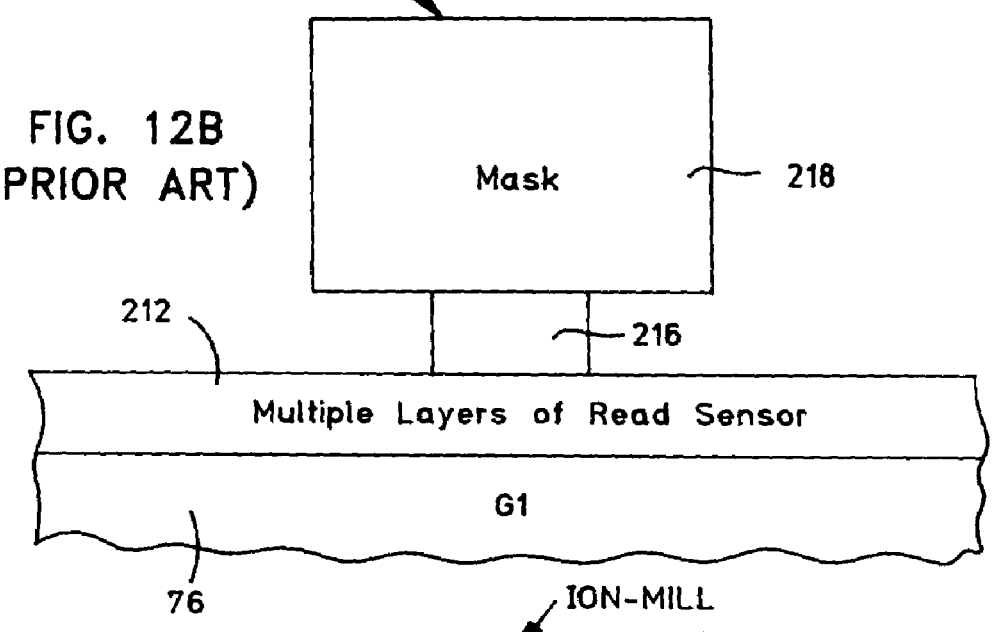

FIGS. 12A–12E illustrate a prior art scheme of constructing the aforementioned read sensor 74, the first and second hard bias layers 140 and 144 and the first and second tapered lead layers 142 and 146 shown in FIG. 9. In FIG. 12A multiple layers of the read sensor 212 are deposited on the first read gap layer (G1) 76. The multiple layers of the read sensor 212 are then annealed in order to develop exchange coupling needed for proper sensor operation. This annealing causes partial oxidation of the cap layer (not shown) of the multiple layers of the read sensor 212, which is typically tantalum (Ta). This problem will be discussed in more detail hereinafter. As shown in FIG. 12B, a bilayer photoresist mask 214, which is well-known in the art, is patterned on the multiple layers of the read sensor 212. The bilayer photoresist mask 214 has first and second photoresists 216 and 218, wherein the first photoresist 216 provides an undercut below each side of the second photoresist 218.

Figure 12C:
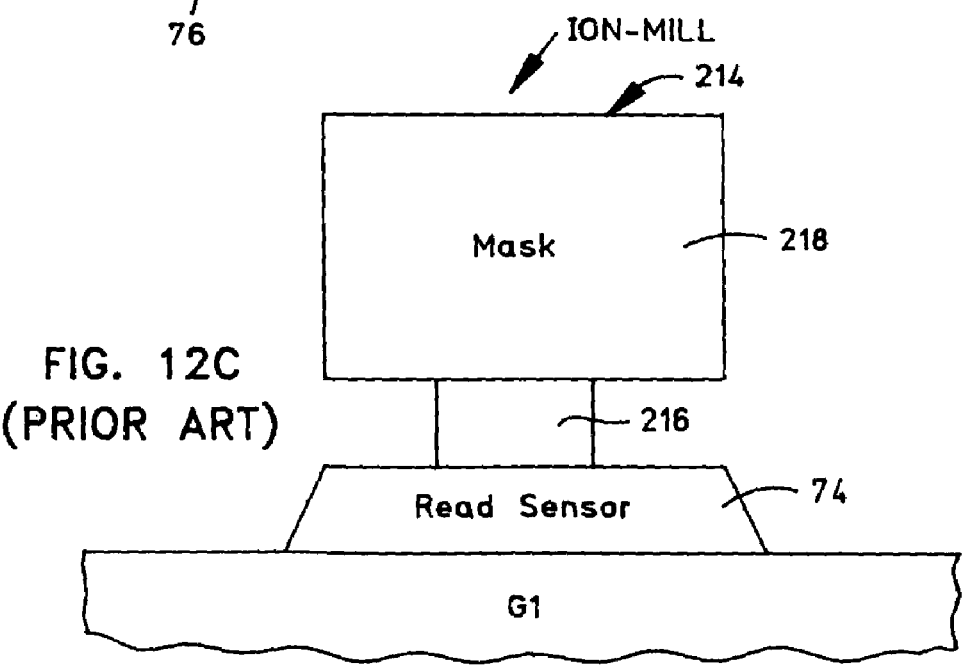
Figure 12D:
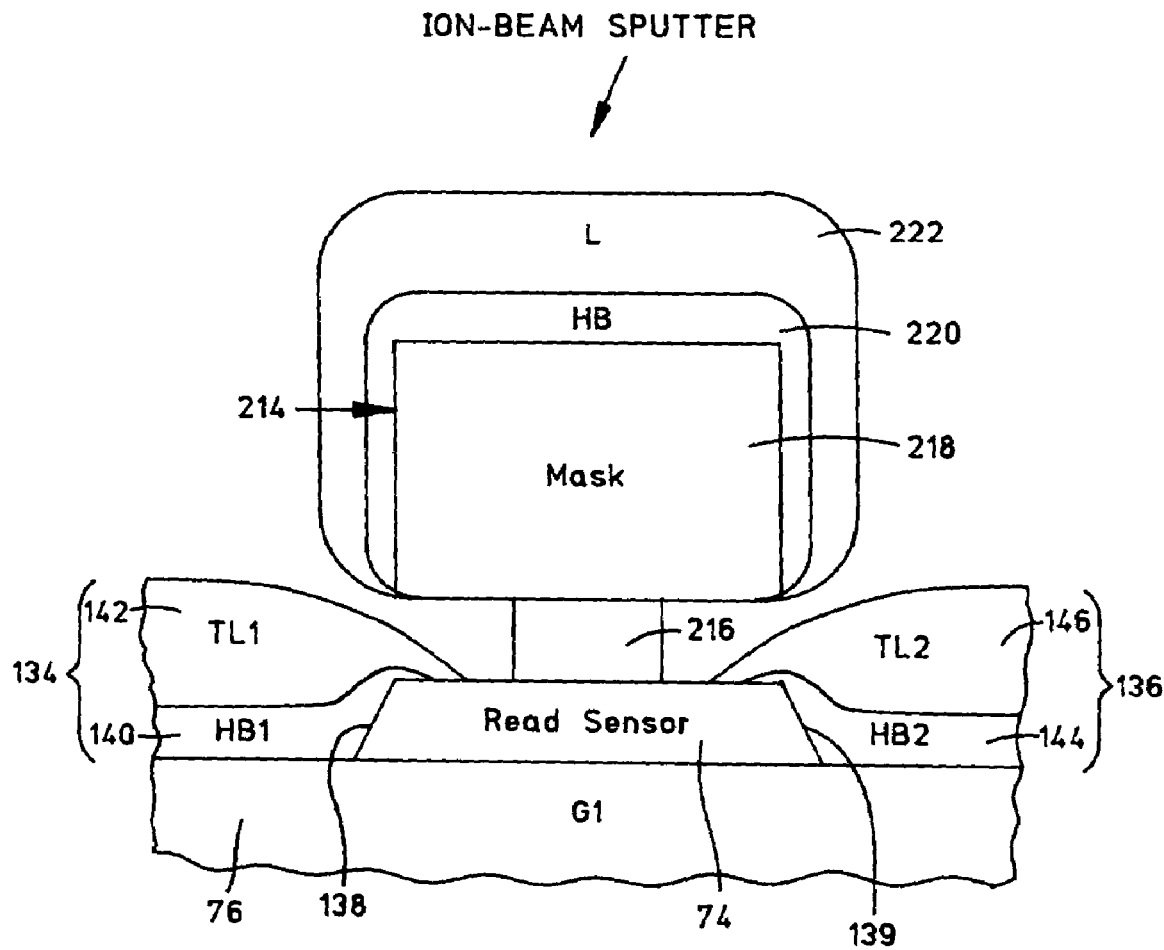
Figure 12E:
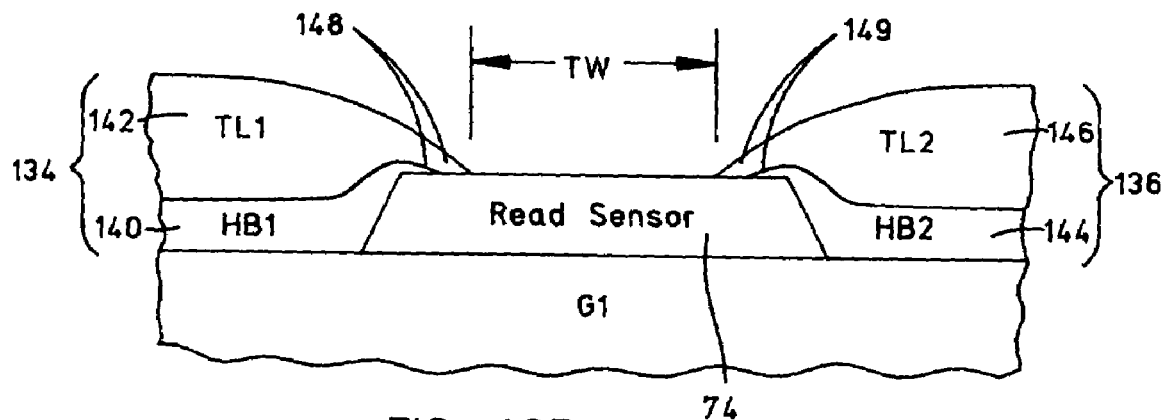

In FIG. 12C ion milling is applied to the wafer 200 in FIG. 11, which is rotated. This causes removal of the multiple layers of the read sensor 212 except for the central portion below the bilayer photoresist mask 214, which constitutes the read sensor 74. In FIG. 12D atoms are ion beam sputtered from a target (not shown) while the wafer is rotated to form the first and second hard bias layers 140 and 144 and the first and second tapered lead layers 142 and 146, which abut the first and second side surfaces 138 and 139 of the read sensor 74. Hard bias (HB) and lead (L) layers 220 and 222 are also deposited on top of the bilayer photoresist mask 214. In FIG. 12E the bilayer photoresist mask 214 is lifted off. FIG. 12E is the same as FIG. 9 except FIG. 9 is a completed read head with the first shield layer 80, the second read gap layer 78 and the second shield layer 82. As stated hereinabove, the tapered portions 148 and 149 are so thin that they cause side reading beyond the track width (TW). In addition, an uncertainty in determining precise locations of tips of the first and second taper portions 148 and 149 causes a difficulty in precisely defining the track width.

The Present Method of Making

Figure 13C:
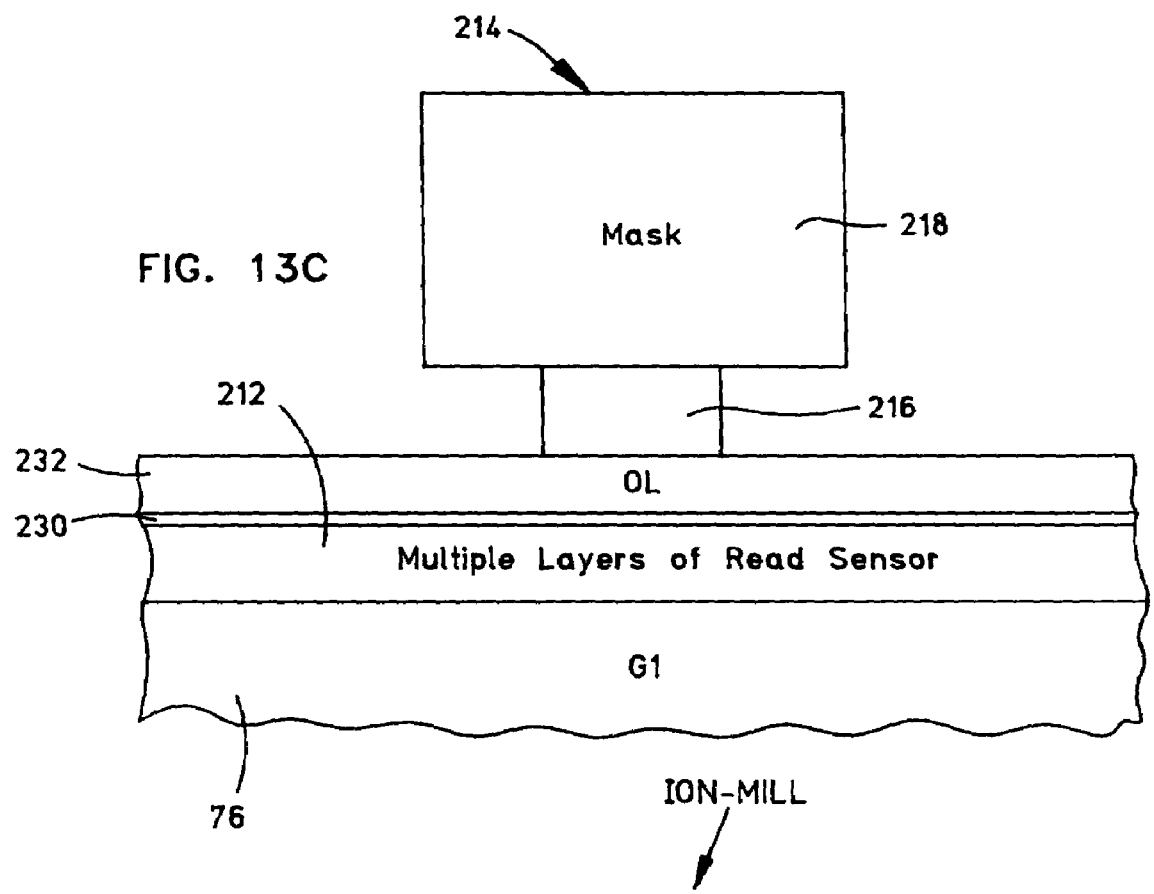
Figure 13D:
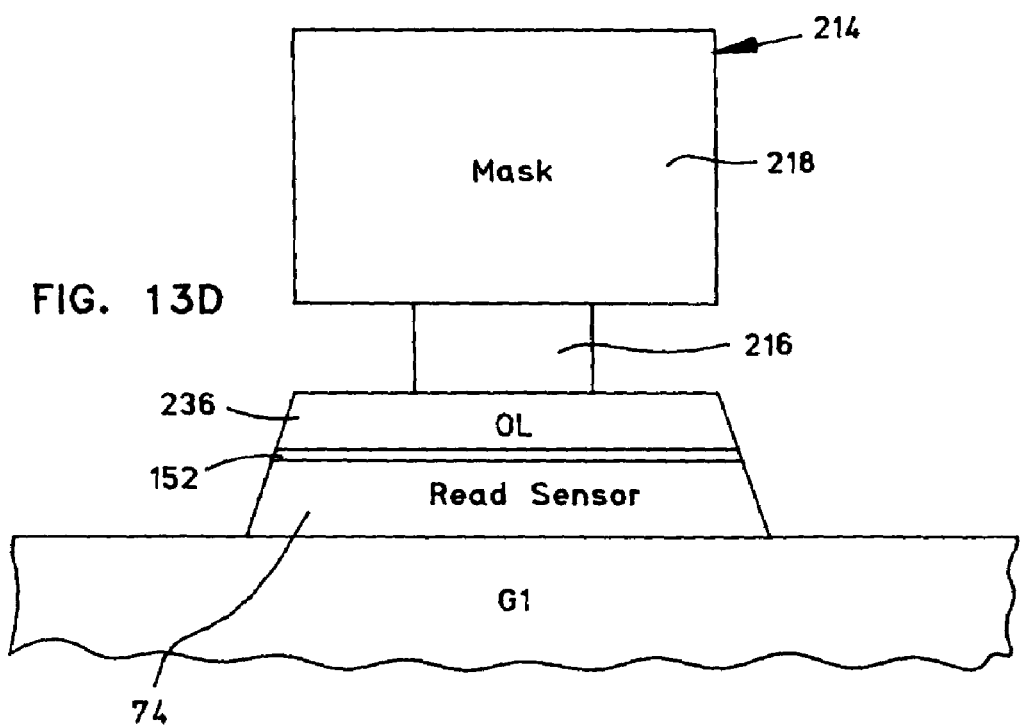

In FIG. 13A the same prior art steps as shown in FIG. 12A are employed except an etch stop layer 230 is deposited on the multiple layers of the read sensor 212 and an overlaying layer (OL) 232 is deposited on the etch stop layer 230. The overlaying lead layer 232 is preferably tantalum (Ta). The multiple layers of the read sensor 212 are then annealed. This annealing causes partial oxidation of overlaying lead layer 232. In FIG. 13B the overlaying lead layer 232 is ion-milled to remove its oxidized portion. An exemplary thickness of the overlaying lead layer 232 in FIG. 13A is 240 Å and an exemplary thickness of the overlaying lead layer after ion milling in FIG. 13B is 200 Å. Accordingly, removal of 40 Å of the overlaying lead layer 232 should be sufficient for removing its oxidized portion. In FIG. 13C the bilayer photoresist mask 214 is patterned on the overlaying lead layers 232 and in FIG. 13D ion milling is applied to remove portions of all the layers except for portions below the mask which constitute the read sensor 74, until the first read gap layer 76 is exposed, an etch stop layer portion 152 and an overlaying lead layer portion 236. Ion milling is conducted while the wafer 200 in FIG. 11 is rotated.

Figure 13E:
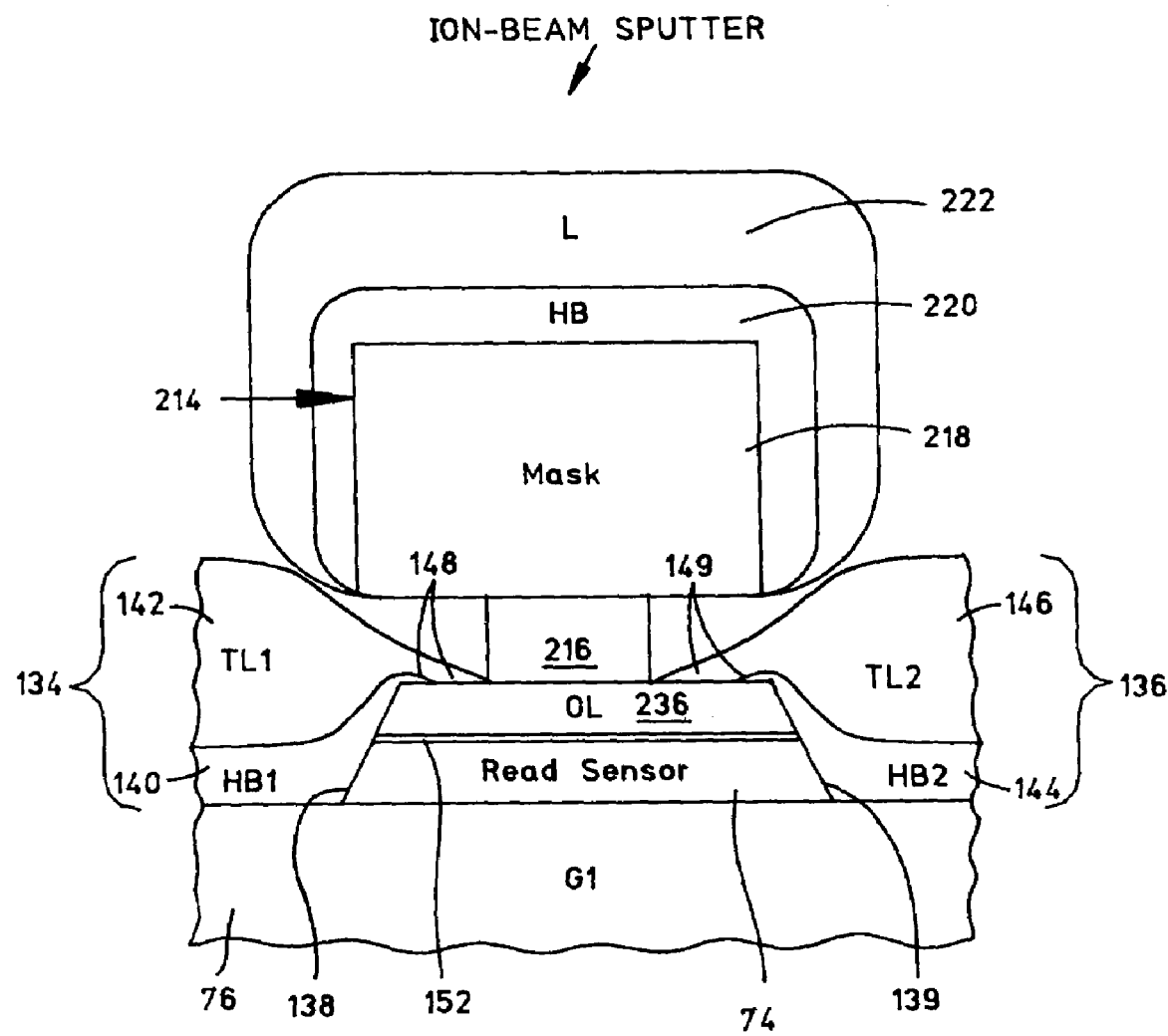
Figure 13F:
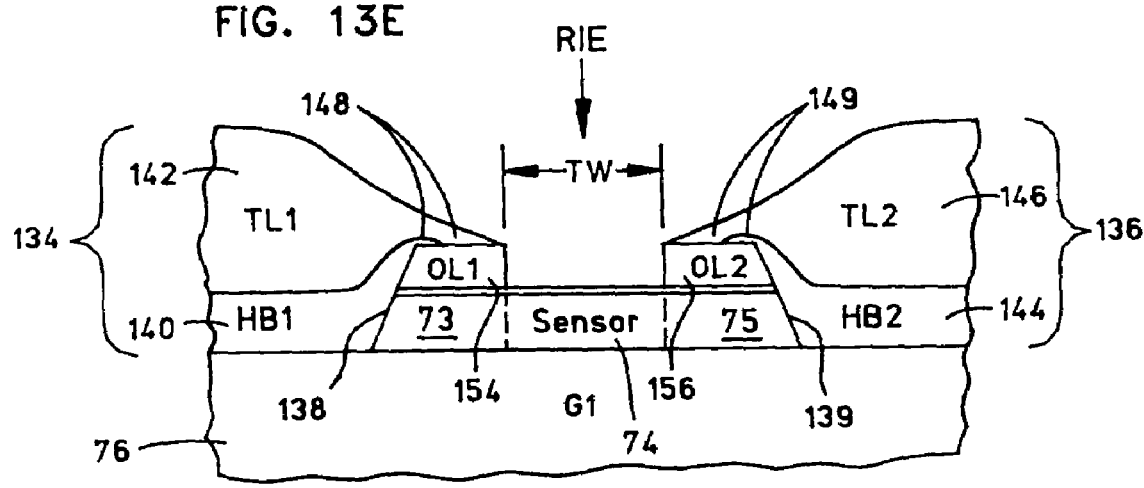

In FIG. 13E first and second hard bias and tapered lead layers 134 and 136 are ion beam sputtered while the wafer 200 in FIG. 11 is rotated. It can be seen that the first and second hard bias and tapered lead layers 134 and 136 have the tapered portions 148 and 149 on the top side portions of the overlaying lead layer 236. In FIG. 13F the bilayer photoresist mask 214 is lifted off along with material deposited thereon and reactive ion etching (RIE) is applied to remove the central portion of the overlaying lead layer 236, between the first and second hard bias and tapered lead layers 134 and 136, leaving first and second overlaying lead layers OL1 and OL2 154 and 156 beneath the tapered portions of the first and second hard bias and tapered lead layers 134 and 136. Only the central portion of the overlaying lead layer 236 is preferentially removed, while the first and second overlaying lead layer portions 154 and 156 beneath the taper regions 148 and 149 are protected by the first and second tapered lead layers 142 and 146 that are preferably rhodium (Rh) which is essentially not removed by reactive ion etching (RIE). FIG. 13F is the same as FIG. 10 except FIG. 10 is a completed read head with the first shield layer 80, the second read gap layer 78 and the second shield layer 82.

DISCUSSION

While not shown, a typical read sensor comprises 30 Å of $Al_2O_3$ as a first seed layer, 30 Å of Ni—Cr—Fe as a second seed layer, 10 Å of Ni—Fe as a third seed layer, 150 Å of PtMn as a pinning layer, 16 Å of Co—Fe as a first AP pinned layer, 8 Å of Ru as an AP coupling layer, 18 Å of Co—Fe as a second AP pinned layer, 22 Å of Cu—O as a spacer layer, 20 Å of Co—Fe as a sense layer, 6 Å of Cu as a first cap layer and 20 Å of Ru as a second cap layer which serves as the aforementioned etched stop layer. As stated hereinabove, the overlaying lead layer may be 240 Å of Ta which, after ion milling, is 200 Å of Ta. The hard bias layers may comprise a bilayer of 30 Å of Cr and 400 Å of Co—Pt—Cr while the first and second lead layers may comprise a bilayer of 30 Å of Cr and 800 Å of Rh. The aforementioned arrangement of the read sensor constitutes a bottom GMR sensor since the pinning layer is closer to the first read gap layer than to the second read gap layer. It should also be understood that alternatively a top GMR sensor may be employed wherein the layers are reversed with the pinning layer being close to the second read gap layer than the first read gap layer. It should be understood that the improved read head assembly in FIG. 10 may be employed in the magnetic head assembly in FIG. 6 which, in turn, may be employed in the magnetic disk drive shown in FIGS. 1–3. Further, the magnetic head assembly may be employed in a tape drive instead of in a magnetic disk drive.

Major improvements attained from this invention are a precise definition of the track width and the feasibility of attaining a very narrow track width for ultrahigh density magnetic recording. In the prior-art read head, the track width is vaguely defined by the tips of the taper portions 148 and 149, which are located somewhere uncertainly in the undercuts of the bilayer photoresist mask 214. To minimize unwanted side reading, the tips of the taper portions 148 and 149 must be as blunted as possible, in order to maximize current shunting. Hence, the first and second hard bias and tapered lead layers 134 and 136 are ion-beam sputtered preferably at a small angle, i.e. 10° from normal, in order to form blunted taper portions 148 and 149. The locations of these taper portions are uncertain mainly due to shadowing effects of the bilayer photoresist mask 214. In contrast, in this invention, the tips of the taper portions 148 and 149 are preferably sharp enough to reach the ends of the undercuts. Hence, the first and second hard bias and tapered lead layers 134 and 136 are ion-beam sputtered preferably at a large angle, i.e. 45° from normal, in order to form sharp taper portions 148 and 149 at the ends of the undercuts. The track width is thus simply defined by the width of the bottom photoresist 216. By precisely controlling the etching rate of the bottom photoresist 216, the width of the bottom photoresist 216 can be precisely controlled to below 0.2 μm. As a result, the track width can be precisely defined, and it is feasible to attain a very narrow track width.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic head assembly, which has surfaces for facing a moving magnetic medium, comprising:
 a read sensor that has a top surface that has first and second side top surface portions and a central top surface portion that is located between the first and second side top surface portions;
 first and second overlaying lead layers interfacing said first and second side top surface portions;
 first and second hard bias layers and first and second lead layers;
 the first hard bias layer and the first lead layer interfacing the first overlaying lead layer and the second hard bias layer and the second lead layer interfacing the second overlaying lead layer;
 the central top surface portion having a width that defines a track width of the read sensor;
 the first and second overlaying lead layers being composed of a first material and the first and second lead layers being composed of a second material;
 the first material being preferentially removable with respect to the second material when subjected to reactive ion etching; and
 the first material being tantalum (Ta), tungsten (W) or molybdenum (Mo) and the second material being rhodium (Rh) or ruthenium (Ru).

2. A magnetic head assembly as claimed in claim 1 further comprising:
 first and second nonmagnetic electrically insulating read gap layers;
 the read sensor, the hard bias layers, the overlaying lead layers, and the lead layers being located between the first and second read gap layers;
 first and second ferromagnetic shield layers; and
 the first and second read gap layers being located between the first and second ferromagnetic shield layers.

3. A magnetic head assembly as claimed in claim 2 further comprising:
 the top surface of the read sensor being flat;
 the first and second overlaying lead layers having first and second side surfaces; and
 a distance between the first and second side surfaces being equal to said track width.

4. A magnetic head assembly as claimed in claim 3 further comprising:
 the first and second hard bias layers interfacing first and second side surfaces of the read sensor.

5. A magnetic head assembly as claimed in claim 4 further comprising:
 a write head overlaying the read sensor and including:
  first and second ferromagnetic pole piece layers that have a yoke portion located between a pole tip portion and a back gap portion;
  a nonmagnetic write gap layer located between the pole tip portions of the first and second ferromagnetic pole piece layers;
  an insulation stack with at least one coil layer embedded therein located between the yoke portions of the first and second ferromagnetic pole piece layers; and
  the first and second ferromagnetic pole piece layers being connected at their back gap portions.

6. A magnetic disk drive, which includes at least one magnetic head assembly, wherein the magnetic head assembly has write and read heads with surfaces for facing a magnetic medium, comprising:
 the write head including:
  first and second ferromagnetic pole piece layers that have a yoke portion located between a pole tip portion and a back gap portion;
  a nonmagnetic write gap layer located between the pole tip portions of the first and second ferromagnetic pole piece layers;
  an insulation stack with at least one coil layer embedded therein located between the yoke portions of the first and second ferromagnetic pole piece layers; and
  the first and second ferromagnetic pole piece layers being connected at their back gap portions;
 the read head including:
  a read sensor having a top surface that has first and second side top surface portions and a central top surface portion that is located between the first and second side top surface portions;
  first and second overlaying lead layers interfacing said first and second side top surface portions;
  first and second hard bias layers and first and second lead layers;
  the first hard bias layer and the first lead layer interfacing the first overlaying lead layer and the second hard bias layer and the second lead layer interfacing the second overlaying lead layer;
  the central top surface portion having a width that defines a track width of the read sensor
  the top surface of the read sensor being flat;
  the first and second overlaying lead layers having first and second side surfaces respectively;
  a distance between the first and second side surfaces being equal to said track width;
  the first and second overlaying lead layers being composed of a first material and the first and second lead layers being composed of a second material;
  the first material being preferentially removable with respect to the second material when subjected to reactive ion etching;
  the first material including tantalum (Ta), tungsten (W) or molybdenum (Mo) and the second material including rhodium (Rh) or ruthenium (Ru);
  first and second nonmagnetic electrically insulating read gap layers;
  the read sensor, the first and second overlaying lead layers, and the first and second hard bias layers and the first and second lead layers being located between the first and second read gap layers;
  first and second ferromagnetic shield layers; and
  the first and second read gap layers being located between the first and second ferromagnetic shield layers;
 a housing;
 said magnetic medium being located in the housing;
 a support mounted in the housing for supporting the magnetic head assembly with said surfaces facing the magnetic medium so that the read head is in a transducing relationship with the magnetic medium;
 means for moving the magnetic medium; and
 a processor connected to the magnetic head assembly and to the means for moving, for exchanging signals with the magnetic head assembly and for controlling movement of the magnetic medium.

7. A magnetic head assembly, which has surfaces for facing a moving magnetic medium, comprising:

a read sensor that has a top surface that has first and second side top surface portions and a central top surface portion that is located between the first and second side top surface portions;

first and second overlaying lead layers interfacing said first and second side top surface portions;

first and second hard bias and tapered lead layers interfacing the first and second overlaying lead layers;

the central top surface portion having a width that defines a track width of the read sensor;

the first and second overlaying lead layers being composed of a first material and the first and second tapered lead layers being composed of a second material;

the first material being preferentially removable with respect to the second material when subjected to reactive ion etching;

the first material being tantalum (Ta), tungsten (W) or molybdenum (Mo) and the second material being rhodium (Rh) or ruthenium (Ru);

first and second nonmagnetic electrically insulating read gap layers;

the read sensor, the hard bias layers, the overlaying lead layers, and the tapered lead layers being located between the first and second read gap layers;

first and second ferromagnetic shield layers; and the first and second read gap layers being located between the first and second ferromagnetic shield layers.

8. A magnetic head assembly as claimed in claim 7 further comprising:

the top surface of the read sensor being flat;

the first and second overlaying lead layers having first and second normal side surfaces respectively that are normal to said top surface; and a distance between the first and second normal side surfaces being equal to said track width.

9. A magnetic head assembly as claimed in claim 8 further comprising:

the first and second hard bias layers interfacing first and second side surfaces of the read sensor.

10. A magnetic head assembly as claimed in claim 9 further comprising:

a write head overlaying the read sensor and including:

first and second ferromagnetic pole piece layers that have a yoke portion located between a pole tip portion and a back gap portion;

a nonmagnetic write gap layer located between the pole tip portions of the first and second ferromagnetic pole piece layers;

an insulation stack with at least one coil layer embedded therein located between the yoke portions of the first and second ferromagnetic pole piece layers; and the first and second ferromagnetic pole piece layers being connected at their back gap portions.

11. A magnetic disk drive, which includes at least one magnetic head assembly, wherein the magnetic head assembly has write and read heads with surfaces for facing a magnetic medium, comprising:

the write head including:

first and second ferromagnetic pole piece layers that have a yoke portion located between a pole tip portion and a back gap portion;

a nonmagnetic write gap layer located between the pole tip portions of the first and second ferromagnetic pole piece layers;

an insulation stack with at least one coil layer embedded therein located between the yoke portions of the first and second ferromagnetic pole piece layers; and the first and second ferromagnetic pole piece layers being connected at their back gap portions; the read head including:

a read sensor having a top surface that has first and second side top surface portions and a central top surface portion that is located between the first and second side top surface portions;

first and second overlaying lead layers interfacing said first and second side top surface portions;

first and second hard bias layers overlapping a first portion of the first overlaying lead layer and a first portion of the second overlaying lead layer, respectively;

a first tapered lead layer overlapping the first hard bias layer and a second portion of the first overlaying lead layer and a second tapered lead layer overlapping the second hard bias layer and a second portion of the second overlaying lead layer;

the central top surface portion having a width that defines a track width of the read sensor;

the top surface of the read sensor being flat;

the first and second overlaying lead layers having first and second normal side surfaces respectively that are normal to said top surface;

a distance between the first and second normal side surfaces being equal to said track width;

the first and second overlaying lead layers being composed of a first material and the first and second tapered lead layers being composed of a second material;

the first material being preferentially removable with respect to the second material when subjected to reactive ion etching;

the first material including tantalum (Ta), tungsten (W) or molybdenum (Mo) and the second material including rhodium (Rh) or ruthenium (Ru);

first and second nonmagnetic electrically insulating read gap layers;

the read sensor, the first and second overlaying lead layers, and the first and second hard bias and tapered lead layers being located between the first and second read gap layers;

first and second ferromagnetic shield layers; and the first and second read gap layers being located between the first and second ferromagnetic shield layers;

a housing;

said magnetic medium being located in the housing;

a support mounted in the housing for supporting the magnetic head assembly with said surfaces facing the magnetic medium so that the read head is in a transducing relationship with the magnetic medium;

means for moving the magnetic medium; and a processor connected to the magnetic head assembly and to the means for moving, for exchanging signals with the magnetic head assembly and for controlling movement of the magnetic medium.

* * * * *